UNITED STATES PATENT OFFICE.

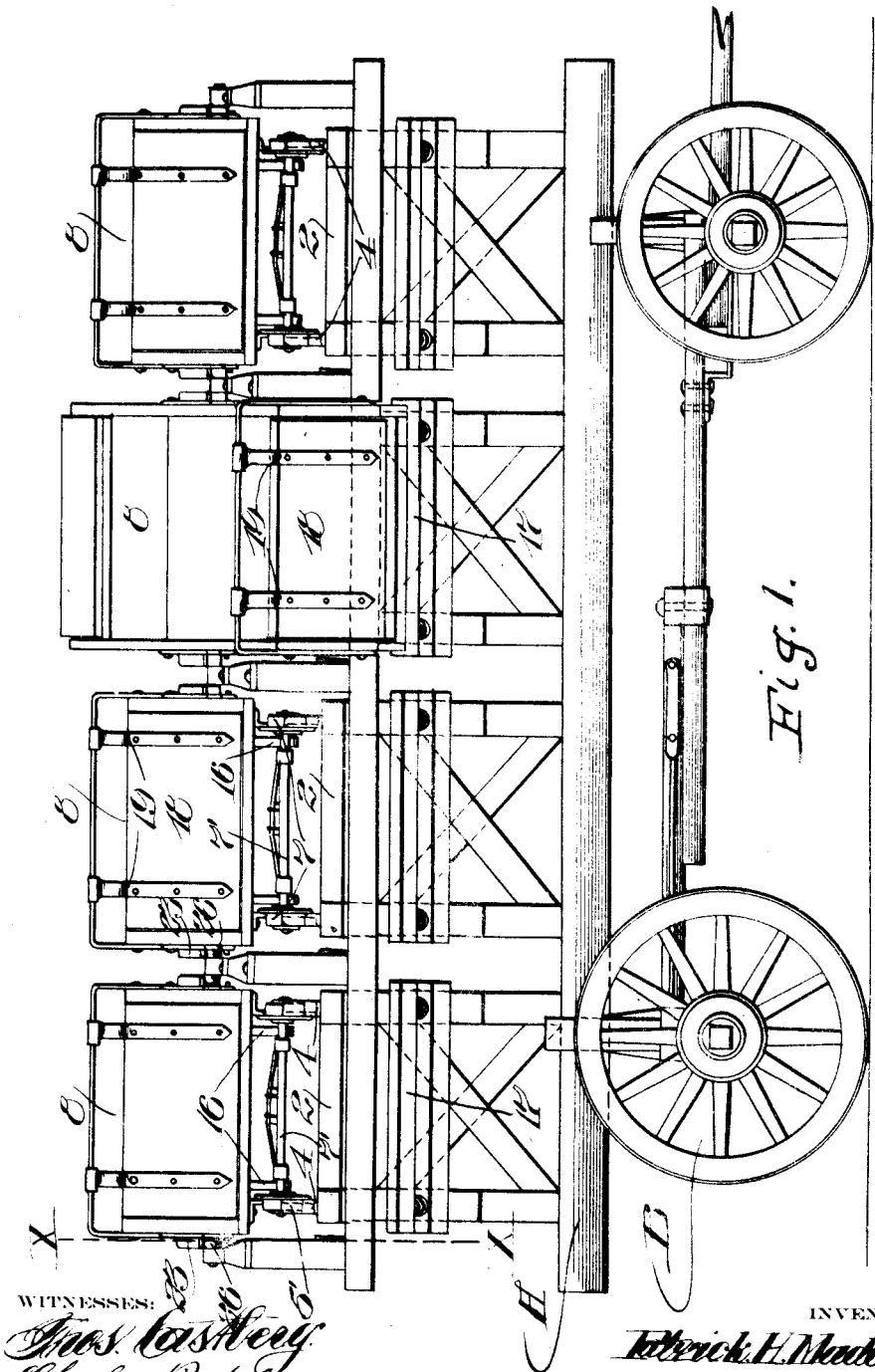

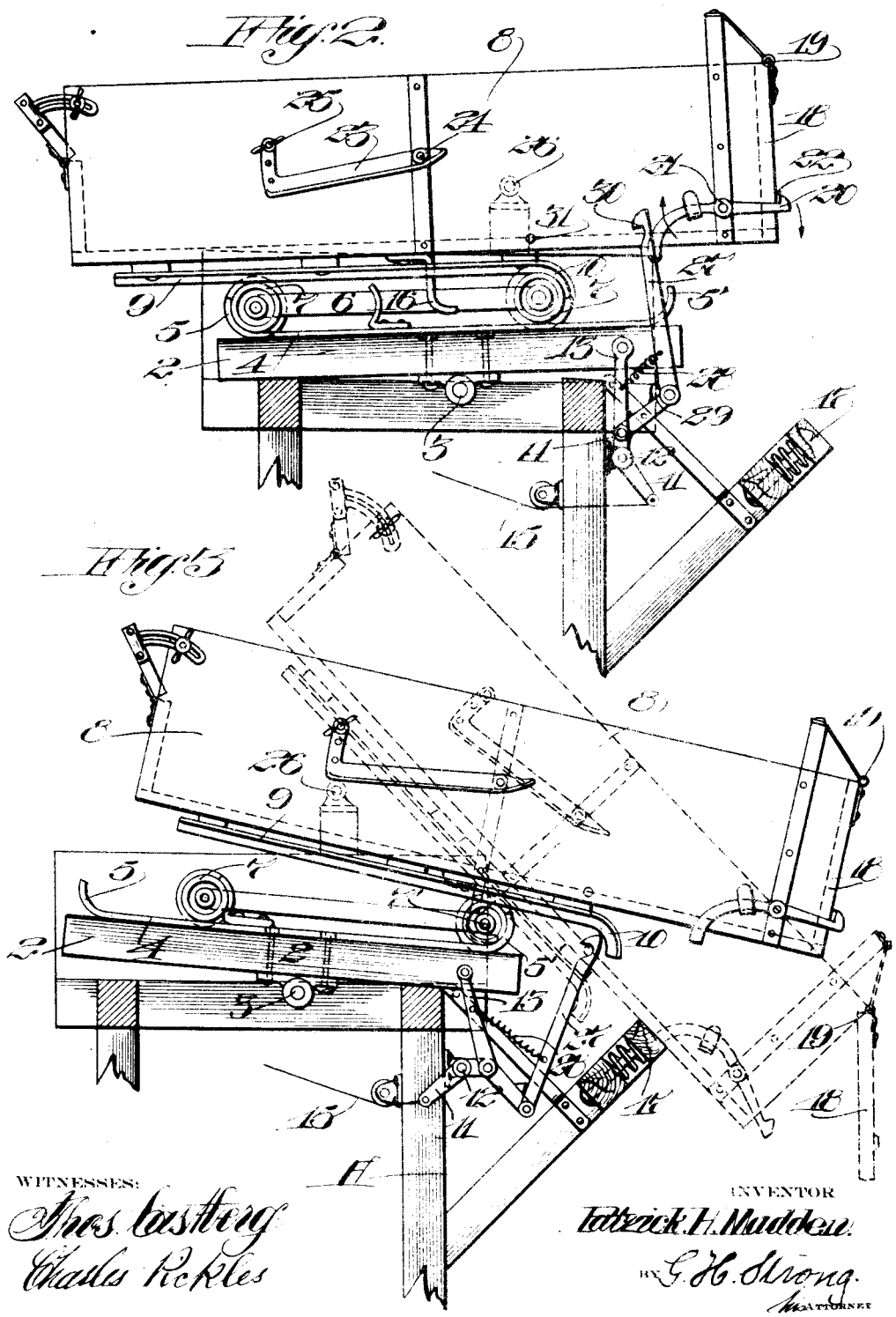

PATRICK H. MADDEN, OF SAN FRANCISCO, CALIFORNIA.

PORTABLE BUNKER.

1,051,340.    Specification of Letters Patent.    Patented Jan. 21, 1913.

Application filed May 31, 1912. Serial No. 700,584.

*To all whom it may concern:*

Be it known that I, PATRICK H. MADDEN, a citizen of the United States, residing in the city and county of San Francisco and State of California, have invented new and useful Improvements in Portable Bunkers, of which the following is a specification.

This invention relates to a portable bunker.

It is the object of this invention to provide a bunker which is portable and which is particularly adapted for use in the unloading of gravel and the like from cars or bins, and delivering it to wagons or other carriers, and which bunker is so constructed and arranged that it may be drawn alongside the cars or bins into any desired position, thereby not necessitating the moving of the latter.

Another object is to provide a bunker having a plurality of sections operating independent of each other, which will admit of certain sections being filled while the contents of other sections are being discharged.

Another object is to provide a simple and efficient means for dumping the loaded bunker sections and for restoring them when emptied, to their normal positions.

The invention primarily resides in a series of bunker sections, mounted to shift transversely of a vehicle frame and running gear, and means for dumping the bunker sections longitudinally so as to discharge their contents clear of the vehicle.

The invention further consists of the parts and the construction and combination of parts as hereinafter more fully described and claimed, having reference to the accompanying drawings, in which—

Figure 1 is a side elevation of the invention. Fig. 2 is a detail in vertical section on the line X—X of Fig. 1, showing the bunker in its normal loading position. Fig. 3 is a similar view illustrating in full lines the bunker in the act of dumping and indicating the dumped position of the bunker in dotted lines.

In the drawings A represents a vehicle frame of any suitable description supported upon a running gear B by means of which the frame and its connected parts may be freely moved about from place to place. The frame A extends a suitable distance above the running gear B and has a series of rocking frames or cradles 2 mounted thereon; the cradles 2 being pivotally mounted to rock transversely of the frame A on a longitudinally extending shaft 3. Each of the cradles 2 is provided with a pair of spaced rails 4 extending transversely of the frame A; the rails 4 being turned upwardly at their ends as indicated at 5—5' to form stops for limiting the forward and backward movements of trucks 6, the wheels 7 of which are mounted to travel on the rails 4. The upturned portions 5—5' of the rails 4 are here shown as curved to correspond to the peripheries of the wheels 7, so as to engage the latter and limit their upward movement. The cradles 2 are designed to be normally inclined backwardly, as shown in Fig. 2, so that the rear wheels 7 of the trucks will rest against the upturned portions 5 of the rails 4. Mounted to ride on the wheels 7 of the trucks are dump-bodies 8, which dump-bodies 8 are provided on their underside with spaced rails 9 which rest on the wheels 7. The forward ends of the rails 9 are turned downwardly, as indicated at 10, which downwardly turned portions of the rails are designed to engage the forward wheels 7 to limit the backward movement of the dump-bodies 8 in relation thereto, as shown in Fig. 2. The longitudinal centers of the dump-bodies 8 are designed to lie rearward of the pivotal points of the cradles 2 on the shaft 3, so that when the cradles 2 are in their normal rearwardly inclined positions the weight of the dump-bodies 8 will act to normally retain the cradles 2 in their rearwardly inclined positions, and also maintain the dump-bodies 8 in their rearmost position in relation to the trucks 6.

Means are provided for rocking the cradles 2 from the position shown in Fig. 2, into the forwardly inclined position shown in Fig. 3. This means is here shown as consisting of levers 11 fulcrumed at 12 on the frame A, which levers are connected to the outer ends of the cradles 2 by means of links 13; a lever 11 being provided for each of the cradles 2. When the cradles 2 are in their rearwardly inclined positions, the pivotal connection 14 between the links 13 and the levers 11, will be in vertical alinement with the pivotal connection of the links 13 on the cradles 2 and the pivotal mountings 12 of the levers 11, or slightly rearward thereof. By this construction, the links 13 form supports for the forward ends of the cradles 2 to normally retain the latter in their rearwardly inclined positions. The lower ends of the levers 11 are connected to cords 15 which lead to any desired point, and through which the levers 11 may be rocked on their fulcrums 12 to move the links 13 outwardly and downwardly and thereby rock the cradles 2 forwardly on the shaft 3 into the position indicated in Fig. 3. This action will cause the trucks 6 to travel downwardly from the forwardly inclined tracks 4 and carry the dump-bodies 8 therewith; the latter traveling on the wheels 7 a distance corresponding to that traversed by the wheels 7 on the rails 4. The forward wheels 7 on contacting the upward portions 5' of the rails 4 bring the trucks 6 to a stop.

Means are provided on the dump-bodies 8 for limiting their forward movement in relation to the trucks 6. This means is here shown as consisting of downwardly extending hook-shaped hangers 16, which are designed to engage the forward axle 7' on which the wheels 7 are mounted. The hangers 16 being positioned rearward of the longitudinal centers of the dump-bodies 8, disposes the greater portion of the load of the dump-bodies on their outer ends, so that when they move downwardly into their forwardmost positions and are engaged by the axles 7', they will tip downwardly into the position indicated by dotted lines in Fig. 3.

Mounted on the frame A are bumpers 17, of any suitable description, which are so disposed as to limit the downward movement of the forward ends of the dump-bodies 8, and cushion the latter at this point. The outer ends of the dump-bodies 8 are provided with gates 18, which are hingedly mounted at 19 on their upper ends to swing outwardly at the bottom. The gates 18 are normally held in their closed positions by means of hooked levers 20, fulcrumed at 21 on the sides of the dump-bodies 8, which levers are designed to engage projections 22 carried on the gates 18, as shown in Fig. 2. The inner ends of the levers 20 are curved downwardly in such manner that when the outer ends of the dump-bodies move downwardly the inner ends of the levers 20 will strike the bumpers 17, so as to rock the levers 20 and move them out of engagement with the projections 22 on the gates 18, thereby allowing the latter to swing outwardly, as indicated by dotted lines in Fig. 3, and thereby permit the contents of the dump-bodies 8 to be discharged therefrom.

Means are provided for insuring the dumping of the dump-bodies 8 at the proper time. This means consists of adjustable flanges 23 pivotally mounted at 24 on the sides of the dump-bodies 8, and rigidly held in place thereon by means of wing nuts 25. The flanges 23 extend downwardly, rearward of the longitudinal centers of the dump-bodies 8, and are designed to be engaged by rollers 26, carried by the frame A; the flanges 23 being engaged by the rollers 26 as the dump-bodies move forward, in such manner as to elevate the rear portions of the dump-bodies and insure their rocking into the dumped position. Mounted on the outer ends of the levers 11 are upwardly extending pawls 27, which are normally retained in their uppermost positions by means of springs 28, extending between the pawls 27 and the links 13; stops 29 being formed on the levers 11 for limiting the movement of the pawls 27. The upper ends of the pawls 27 are notched at 30, to receive pins 31 extending outwardly from the sides of the dump-bodies 8, when the latter are in their dumped position. The purpose of this construction is to provide means for connecting the outer portion of the dump-bodies 8 to the levers 11, so that by lifting the outer ends of the dump-bodies 8 in an upward direction, or by depressing the inner ends thereof, the levers 11 will be rocked so as to restore the cradles 2 to their normal rearwardly inclined positions. When this is done the trucks 6 will gravitate downward on the tracks 4, carrying the dump-bodies 8 therewith, thereby restoring the latter to their normal loading position; the gates 18 swinging back into their closed position into engagement with the levers 20.

In the operation of the invention the bunker is drawn alongside the car or bin to be unloaded, and the materials to be conveyed by the dump-bodies 8 are delivered thereto, in any suitable manner; the latter being previously disposed in their loading position, as shown in Fig. 2. When a dump-body has been sufficiently loaded, the wagon, or other conveyance to which it is desired to deliver the contents of the dump-body, is moved alongside the vehicle frame A; a cord 15 is then operated to actuate a lever 11, so as to rock the cradle 2 beneath the dump-body 8 to be dumped. This action causes the truck 6 and the dump-body 8 to move downward on the forwardly inclined tracks 4, as before described, to discharge the contents of the dump-body 8 through the gate 18; the dump-body is then restored to its normal loading position by elevating its forward end or depressing its rearward end, in any desired manner.

Having thus described my invention, what I claim and desire to secure by Letters Patent, is—

1. The combination in a loading device of a lower tilting track, a dumping bed with underneath track parallel with and vertically above the lower track, a truck entirely disconnected from each set of tracks, which truck runs on the first track, the second track running on the truck, and means for giving an inclination to the truck and tracks to cause the truck and bed to gravitate in the same direction.

2. In a bunker, the combination of a dump-body, rollers on which the dump-body rests in movable contact therewith, a rock-frame on which the rollers travel, means for tilting the rock-frame to cause the rollers to gravitate back and forth thereon and carry the dump-body therewith.

3. In a bunker, the combination of a dump-body, rollers on which the dump-body rests in movable contact therewith, a rock-frame on which the rollers travel, means for tilting the rock-frame to cause the rollers to gravitate back and forth thereon and carry the dump-body therewith, means for limiting the movement of the rollers in each direction, and means on the dump-body for engaging the rollers to limit its movement in longitudinal relation thereto.

4. In a bunker, the combination of a rock-frame, a truck mounted to travel on the rock-frame, a dump-body mounted to travel on the truck, means for normally retaining the rock-frame, truck and bunker in a fixed position in relation to each other, and means for tipping the rock-frame to impel the truck and the dump-body forward to dump the latter.

5. In a bunker, the combination of a rock-frame, a truck mounted to travel on the rock-frame, a dump-body mounted to travel on the truck, means for normally retaining the rock-frame, truck and bunker in a fixed position in relation to each other, means for tipping the rock-frame to impel the truck and the dump-body forward to dump the latter, and means for engaging the dump-body with the truck to limit its forward movement.

6. In a bunker, the combination of a rock-frame, a truck mounted to travel on the rock-frame, a dump-body mounted to travel on the truck, means for normally retaining the rock-frame, truck and bunker in a fixed position in relation to each other, means for tipping the rock-frame to impel the truck and the dump-body forward to dump the latter, means for engaging the dump-body with the truck to limit its forward movement, means for limiting the forward movement of the truck in relation to the rock-frame, and resilient means for limiting the dumping movement of the dump-body.

7. In a bunker, the combination of a rock-frame, a truck mounted to travel on the rock-frame, a dump-body mounted to travel on the truck, means for normally retaining the rock-frame, truck and bunker in a fixed position in relation to each other, means for tipping the rock-frame to impel the truck and the dump-body forward to dump the latter, means for engaging the dump-body with the truck to limit its forward movement, means for limiting the forward movement of the truck in relation to the rock-frame, resilient means for limiting the dumping movement of the dump-body, and means for automatically connecting the dump-body to the rock-frame when in its dumped position so that the latter will be rocked to restore it to its normal position when the dump-body is rocked from the dumped into a horizontal position.

In testimony whereof I have hereunto set my hand in the presence of two subscribing witnesses.

PATRICK H. MADDEN.

Witnesses:
JOHN H. HERRING,
GENEVIEVE S. DONELIN.